United States Patent Office 3,472,826
Patented Oct. 14, 1969

3,472,826
SATURATED HYDROCARBON PREPOLYMER AND REACTION PRODUCTS THEREOF
James E. Potts, Millington, and Arnold C. Ashcraft, Jr., Somerset, N.J., and Edgar W. Wise, Charleston, W. Va., assignors to Union Carbide Corporation, a corporation of New York
No Drawing. Continuation-in-part of application Ser. No. 481,924, Aug. 23, 1965. This application May 23, 1968, Ser. No. 731,623
Int. Cl. C08f 27/08, 15/04
U.S. Cl. 260—88.2          8 Claims

ABSTRACT OF THE DISCLOSURE

Reactive saturated hydrocarbon prepolymer having functional groups at the ends of each polymer molecule comprising a free-radical initiated interpolymer of ethylene and an alpha-olefin having the formula

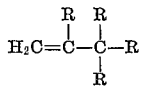

wherein each R individually represents hydrogen, an alkyl group of 1 to 6 carbon atoms or fluorine.

SPECIFICATION

This application is a continuation-in-part of copending application Ser. No. 481,924, filed Aug. 23, 1965.

BACKGROUND

This invention relates to saturated hydrocarbon prepolymers having a reactive functional group at the ends of each polymer molecule which are capable of being reacted with polyfunctional compounds to produce cured cross-linked products and high molecular weight linear products.

PRIOR ART

Presently available hydrocarbon prepolymers such as carboxy terminated polybutadiene and copolymers of butadiene and acrylic acid are deficient in that they are subject to deterioration with age as a result of attack by chemical oxidants and atmospheric ozone at the double bond sites in the prepolymers. Consequently the utility of such unsaturated hydrocarbon prepolymers is seriously restricted.

SUMMARY

The present invention provides a saturated hydrocarbon prepolymer having a carbon to hydrogen ratio, exclusive of the reactive functional groups, of substantially 1 to 2. The prepolymers of the present invention are characterized by a number average molecular weight (determined by vapor phase osmometry) of from about 250 to about 10,000, preferably from about 500 to about 5,000, and a narrow molecular weight distribution, that is at least 60 percent by weight of the prepolymer has a molecular weight within ±33 percent of the average molecular weight of the prepolymer. The prepolymers can be in the form of a pourable liquid at room temperature (about 25° C.) having a viscosity of from about 100 to about 55,000 cps. at 25° C. or it can be a solid having a melt flow at 44 p.s.i. and 190° C. (ASTM D1238–57T) as low as about 1000 decigrams per minute.

The saturated hydrocarbon prepolymers of this invention comprise substantially random free-radical initiated interpolymers of ethylene and an alpha-olefin having the formula

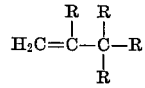

wherein each R individually represents hydrogen, an alkyl group of 1 to 6 carbon atoms inclusive or fluorine, said interpolymer containing from about 5 to 70 percent by weight, based on the weight of the interpolymer, of combined alpha-olefin, said interpolymer having an average of from about 1 to about 2 reactive functional groups attached to the terminal carbon atoms of each polymer molecule selected from the group of hydroxyl (—OH), carboxy (—COOH), amino (—NH$_2$), cyano (—CN), formyl (—CHO), aziridinyl

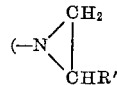

wherein R′ is lower alkyl), and alkoxy-carbonyl (—COOR″ wherein R″ is lower alkyl). The prepolymers of this invention and the corresponding reaction products will be amorphous where the alpha-olefin described above is present in amounts of about 30 percent by weight and higher and will be crystalline where the alpha-olefin is present in amounts of less than about 30 percent by weight.

DESCRIPTION

The term "reactive functional group" as used herein refers to a group which will react with a polyfunctional cross-linking agent to produce a three dimensional cured product and/or a difunctional reactant to produce a high molecular weight, linear polymeric product. Suitable cross-linking agents and difunctional reactants, and the specific products formed, are described herein.

The preferred alpha-olefin for copolymerization with ethylene is determined by the application in which the polymer is to be used. For example, in applications in which the chain stiffening effect of the bulky tertiary butyl group is desired the alpha-olefin of choice is 3,3-dimethyl butene-1, also known as neohexene and tertiary butyl ethylene. In applications where exceptional chemical resistance is required the monomers of choice are 3,3,3-trifluoropropene-1 or 2-fluoro, 3,3,3-trifluoro propene-1. If it is desired that the polymer exhibit exceptionally low viscosity at a given molecular weight the monomer of choice is propene-1. If exceptional impermeability to gases is required, the monomer of choice is 2-methyl propene-1. If exceptional low temperature flexibility is required the monomer of choice is pentene-1 or hexene-1. In those applications where two or more of these properties are desired in the same polymer that monomer is chosen which gives the best balance of properties. Alternately, two or more monomers can be chosen to copolymerize with ethylene to make a terpolymer having the desired balance of properties.

The saturated hydrocarbon prepolymers of this invention are prepared, in general, by a free radical catalysis reaction of ethylene and an alpha-olefin as described herein in the presence of an azo or organic peroxide free radical initiator present in an amount sufficient to initiate the free radical polymerizations, permit propagation of the polymer chain, and to terminate the chain after the desired molecular weight is attained. The initiator, when used in amounts in excess of normal catalytic amounts, places a reactive functional group at the beginning of the polymer chain upon initiation of the free radical reaction, and then places a second reactive function group at the other end of a certain proportion of the polymer chain when the desired molecular weight is attained thereby terminating polymerization. To achieve these ends, a free radical initiator is generally employed in amounts greatly in excess of normal catalytic amounts (from 1 to 2 percent by weight), that is, from about 3 to about 30 percent by weight based on the weight of ethylene and alpha-olefin. If desired, the amount of initiator required can be reduced by using a chain transfer agent. From about 1 to about 30 percent by weight, preferably from about 1 to 10 percent by weight based on the weight of ethylene and alpha-olefin, of a chain transfer agent can be used to terminate polymerization and place a reactive functional group on the terminal carbon atom of the polymer chain.

However, the free radical resulting from the chain transfer reaction must be capable of initiating polymerization the same as free radicals from the initiator. It is preferred to carry out the polymerization, therefore, in the presence of a chain transfer agent to enhance the terminal functionality of the prepolymer. Suitable chain transfer agents include carbon tetrachloride, bromotrichloromethane, carbon tetrabromide, alpha-bromoisobutyric acid, esters of alpha-bromoisobutyric acid such as methylalpha-bromoisobutyrate, mono-, di- and trichloroacetic acid, and like compounds which will undergo halogen transfer reactions with polymer chain radicals.

The polymerization may be either in bulk or solution in which the initiator is usually added as a solution in a suitable solvent. In solution polymerization, a suitable solvent is a solvent for ethylene and the alpha-olefin, is compatible with the interpolymer formed, and is inert with respect to the reactants and initiator. Aliphatic, aromatic and heterocyclic solvents are suitable as long as they satisfy the foregoing conditions, and oxygen containing solvents such as tertiary butyl alcohol, dioxane, and tetrahydrofurane are especially suited for use with peroxide initiators.

The conditions of the free radical catalysis are such that chain transfer and homopolymerization of either ethylene or alpha-olefin are minimized. Suitable temperatures are in the range of from 25° to 150° C. while pressures can be from 500 to 50,000 p.s.i.g. and preferably from 2,000 to 40,000 p.s.i.g. Since molecular weight is a function of pressure, prepolymers of increasing molecular weight can be prepared by employing progressively higher pressures.

The choice of the azo or organic peroxide initiator, and chain transfer agent will depend on the reactive functional group to be placed at the terminals of the polymer chain. For example, a carboxy terminated polymer can be prepared using dicarboxylic acid peroxides such as oxalic acid peroxide, sebacoyl peroxide, glutaric acid peroxide, succinic acid peroxide, cyclopropane-1,2-dicarboxylic acid peroxide, and alkyl substituted glutaric and succinic acid peroxides such as for example methyl glutaric acid peroxide and the like. These dicarboxylic acid peroxides can be prepared by reacting the dicarboxylic acid anhydrides with about 10 percent hydrogen at temperatures below 30° C. for a period of two hours or less. Other initiators for producing a carboxy terminated polymer include esters of azobisalkanoic acid such as dimethyl azobisisobutyrate, diethyl azobisisobutyrate esters of 4,4'-azobis-4-cyanopentanoic acid and the like. A suitable chain transfer agent for introducing a terminal carboxy group is alpha-bromoisobutyric acid or the alkyl esters thereof and the like.

Terminal cyano groups can be introduced by using azobisisobutyronitrile as the initiator. This initiator also affords a means of placing other functional groups at the terminals of the polymer chain. For example, the cyano group can be hydrolyzed in acidic or basic medium to the carboxy group or it can be reduced with lithium aluminum hydride to the amino group, or it can be subjected to alcoholysis to convert it to the alkoxycarbonyl group.

Terminal alkoxycarbonyl groups can be introduced by using diethyl-2,2-azobisisobutyrate (prepared as described in U.S. Patent 2,877,212) as the initiator. These groups can then be hydrolyzed to carboxy groups, or reduced to hydroxy groups.

Terminal formyl groups can be introduced by oxidizing a prepolymer having terminal hydroxy groups with potassium dichromate.

Terminal aziridinyl groups can be introduced by substituting or displacing the terminal hydroxy groups of a prepolymer with chlorine and then reacting the chlorine atoms with ethylene imine.

Terminal halogen atoms can be introduced using a halogen containing chain transfer agent as mentioned previously. A terminal halogen atom and a terminal carboxylic acid group can be introduced simultaneously by using a halogen containing carboxylic acid chain transfer agent as mentioned previously. The halogen atom can then be converted by dehydrobromination and subsequent oxidation of the resultant double bond to a carboxylic acid group.

In a specific embodiment of this invention, saturated hydrocarbon liquid prepolymers having an average of from about 1 to about 2 carboxy or amino groups attached to the terminal carbon atoms of each polymer molecule are prepared by reacting ethylene and from about 5 to about 70 percent by weight of an alpha-olefin as described above in the presence of from about 3 to about 30 percent by weight of azobisisobutyronitrile as a free radical reaction initiator, said weights of alpha-olefin and initiator being based on the weight of ethylene and alpha-olefin, to produce a prepolymer of ethylene and said alpha-olefin having cyano (—CN) groups attached to the terminal carbon atoms, and thereafter hydrolyzing the cyano groups to carboxy groups or reducing them to amino groups. This mode of introducing terminal carboxy or amino groups is especially advantageous since it employs a readily available initiator yet results in a hydrolyzed or reduced product substantially free of cyano groups.

The saturated hydrocarbon prepolymers of this invention are useful in themselves as potting compounds or the lithium or sodium salts thereof are useful as high performance lubricants. Cured or cross-linked prepolymers are flexible or elastomeric materials which find utility in binder, potting and encapsulation applications, or can be used as a sound deadener as electrical insulation, as a sealant, or can be formed into a gasket or weather stripping. The linear reaction products of the prepolymers can be formed into fibers and films or molded into a variety of useful articles.

In general, the saturated hydrocarbon prepolymers of this invention are cured by admixing with about a stoichiometric amount of a polyfunctional cross-linking agent having reactive groups capable of reacting with the terminal functional groups on the prepolymer molecule to produce a three dimensional cured product, and heating to promote the cure. Linear products on the other hand are prepared by admixing the prepolymer with about a stoichiometric amount of a difunctional compound having reactive groups capable of reacting with the terminal functional groups on the prepolymer molecule to produce a high molecular weight linear product, and heating to promote the reaction.

Polyfunctional cross-linking agents containing groups reactive with terminal carboxy groups include polyepoxides such as the triglycidyl ether of para-aminophenol, 2,4-epoxy-6-methyl - cyclohexylmethyl-3,4-epoxy-6-methylcyclohexane carboxylate, the diglycidyl ether of 2,2-bis(4-hydroxyphenyl) propane, and the like; polyisocyanates such as tolylene triisocyanate, polyethylene triisocyanate, polyphenylmethylene triisocyanates and the like; polyaziridines such as tris-(N methyl ethylene imine) phosphorous oxide, tris-(N methyl ethylene imine) phosphorous sulfide and the like; polyamines such as diethylenetriamine, triethylenetetraamine, tetraethylene pentamine, triaminobenzene, triaminonaphthalene, and the like; and polyols such as propane triol, hexane triol, polyoxyalkylene polyols, lactone polyols and the like. Cross-linking agents containing groups reactive with terminal hydroxyl groups include polyisocyanates and polyaziridines as described previously and polycarboxylic acids such as 1,2,4-hexanetricarboxylic acid, 2-propyl-1,2,4-pentanetricarboxylic acid, 5 - octane - 3,3,6 - tricarboxylic acid, 1,2,3-propanetricarboxylic acid, 3-hexene-2,2,3,4-tetracarboxylic acid, 1,2,3,4-benzenetetracarboxylic acid, acid chlorides of the foregoing, and the like. Cross-linking agents containing groups reactive with terminal amino groups include polyisocyanates, polyepoxides, and polycarboxylic acids as described previously and the like. Cross-linking agents and difunctional compounds containing groups reactive with terminal formyl groups include polymethylolated phenolic compounds such as 2,4,6-trimethylolphenol, trimethylolated bisphenol sulfone, trimethylol-p-tert - butylphenol, dimethylol-p-methylphenol, catechol, resorcinol, hydroquinone, pyrogallol, hydroxyhydroquinone, phloroglucinol, and the like. Cross-linking agents and difunctional compounds containing groups reactive with terminal cyano groups include 1,3-dipole producing compounds such as para-phenylenebistetrazole, terephthalonitrile dioxide, isophthalonitrile dioxide and the like. Cross-linking agents and difunctional compounds containing groups reactive with terminal alkoxycarbonyl groups include compounds capable of entering into a trans-esterification reaction with an alkoxycarbonyl group such as diols and polyols as described herein and the like. Cross-linking agents and difunctional compounds containing groups reactive with terminal aziridinyl groups include di- and polycarboxylic acids as described herein, diols and polyols as described herein, and the like.

Difunctional compounds having reactive groups capable of reacting with terminal carboxy groups include diols and diisocyanates to produce polyesters and polyamides respectively; suitable diols include ethylene glycol, diethylene glycol propylene glycol, dipropylene glycol, glycerol, and the like; suitable diisocyanates include 2,4-tolylene diisocyanate, 2,6-tolylene diisocyanate, bis(4-isocyanatophenyl)-methane, polyphenylmethylene diisocyanates and the like. Difunctional compounds having groups reactive with terminal hydroxyl groups include diisocyanates as described previously to produce polyurethanes and dicarboxylic acids to produce polyesters such as malonic acid, succinic acid, glutaric acid, adipic acid, maleic acid, fumaric acid, glutaconic acid, muconic acid and the like. Prepolymers containing terminal amino groups can be reacted with adipic acid to produce polyamides.

The prepolymers of this invention may contain fillers and/or additives to plasticize, extend, lubricate, prevent oxidation or lend color. Such fillers and additives are well known in the art and may be incorporated without departing from the scope of the invention.

The prepolymers of this invention have been described as being prepared by free radical catalysis. The method is preferred since it insures that the reactive functional groups will be located at the terminal positions of each polymer chain. However, reactive functional groups can be introduced into the prepolymer chain by copolymerizing with ethylene and an alpha-olefin as described herein, a monomer containing the desired functional group. For example, a prepolymer containing carboxy groups can be prepared by reacting ethylene, an alpha-olefin as described herein and sufficient amounts of an alpha-unsaturated mono or dicarboxylic acid such that from 2 to 4 carboxy groups are included in each polymer molecule.

The following examples are intended to further illustrate this invention without limiting the same in any manner. All parts and percentages are by weight unless indicated otherwise.

EXAMPLE I

In a 1.5 liter, stainless steel lined, Magnedrive autoclave was placed 600 g. of benzene and 167 g. neohexene. The autoclave was sealed, purged with ethylene, and pressurized with ethylene to 15,000 p.s.i.g. One gram of azobisbutyronitrile in benzene was then pumped into an autoclave. The reaction was carried out at 90° C. for 5 hours. Fifty-five grams of solid prepolymer were recovered containing 11.5 percent neohexene. The prepolymer had a specific viscosity of 0.228, a melt flow of 1,000 decigrams per minute at 44 p.s.i. and 190° C., a density of 0.91, a tensile strength (ASTM D368–60T) of 870 p.s.i., and an elongation of 140%. The prepolymer contained ethylene crystallinity as evidenced by infrared absorption at 13.7 microns. The terminal cyano groups were converted to carboxy groups by alkaline hydrolysis confirmed by the presence of carboxy absorption in the infrared. The prepolymer is cured to a flexible product with a stoichiometric amount of the triglycidyl ether of paraaminophenol with heating at 50° C. The prepolymer is also reacted with a stoichiometric amount of 2,4-tolylene diisocyanate to form a polyamide and with a stoichiometric amount of succinic acid to form a polyester.

EXAMPLE II

To a stirred pressure vessel was charged 688 grams benzene, 121 grams neohexene and ethylene to a pressure of 5,000 p.s.i.g. Azobisisobutyronitrile was added initially in an amount of 2 grams. During the run an additional 12.65 grams were added by pumping into the reactor a solution of initiator in benzene. The temperature during the run was 88–91° C. and the pressure was maintained at 5,000 p.s.i.g. by feeding ethylene on demand. The reaction time was 2.92 hours. 102 grams of prepolymer resulted after removal of unreacted ethylene, neohexene and benzene. The conversion was 30%. This polymer had a specific viscosity of 0.082 and a nitrogen content of 1.63%. The number average molecular weight was 1,500 (determined by vapor phase osmometer in chloroform). This copolymer was a white, waxy material containing 18.5% by weight neohexene. Alkaline hydrolysis converted the —CN groups to —COOH groups as evidenced by the disappearance of a sharp band at 4.46 microns in the infrared and appearance of a carbonyl absorption characteristic of —COOH groups around 5.85 microns wave length. This product was carefully dried under 25″ vacuum and reacted with a stoichiometric amount of MAPO (tris propylene imine phosphoric oxide). After 24 hours at 100° F. a soft gel was obtained which became progressively stiffer over a period of one week.

EXAMPLE III

One hundred grams benzene, 669 grams neohexene and sufficient ethylene to reach a pressure of 10,000 p.s.i.g. were placed in a stirred pressure vessel. The neohexene charge represented 75% by weight of the monomer charge. 3.2 grams of azobisisobutyronitrile were added initially and 3.6 grams were added during the run as described in Example II. The reaction was allowed to proceed at 90° C. at 10,000 p.s.i.g. for 1.7 hours. 33 grams of resin were recovered as a residue product after removal of volatiles. The copolymer had a specific viscosity of 0.049 and contained 2.99% nitrogen. The number average molecular weight was 1280. This copolymer was a heavy liquid at room temperature, similar to cold molasses. Functional group analysis indicated that this material contained at least 2 nitrogen groups per molecule.

Two parts of this resin were reacted with 1 part of 48% HBr in a sealed tube at 210° C. for 15 hours with vigorous agitation, dissolved in hexane, washed with water and dried over MgSO$_4$. After vacuum drying in a rotary evaporator for one hour the infrared showed no significant amount of nitrile absorption and a deep carboxyl band at 5.85 microns. This polymer was found to contain 61% combined neohexene by nuclear magnetic resonance spectroscopy. The absence of ethylene crystallinity in this polymer was proven by the absence of an ethylene crystallinity band at 13.7 microns in the infrared spectra. The polymer is cured with a stoichiometric amount of MAPO to a cured elastomeric material and successfully used as a sealant.

EXAMPLE IV

One hundred grams of benzene, 669 grams of neohexene (75% of the entire monomer charge) and ethylene (added until the pressure reached 10,000 p.s.i.g.) were charged to a stirred pressure vessel along with 3.2 grams of azobisisobutyronitrile. During the run an additional 25.8 grams of catalyst were added in benzene. The run proceeded for 3.75 hours at 90° C. and 10,000 p.s.i.g. 110 grams of resin were recovered by removing volatiles in a distillation step and finally in a vacuum oven. This copolymer had a specific viscosity of 0.016 and contained 4.78% nitrogen. The number average molecular weight was 811. The average number of N atoms per molecule was 2.77. This polymer contained 62% by weight neohexene by nuclear magnetic resonance spectroscopy and was a pale amber liquid at room temperature having the viscosity of mollasses.

EXAMPLE V

Example IV was duplicated to prepare two prepolymers which were pourable liquids at room temperature having the following properties

|  | A | B |
|---|---|---|
| Percent neohexene | 52 | 64 |
| Specific viscosity | 0.037 | 0.040 |
| Percent nitrogen | 1.35 | 1.50 |
| Number average, molecular weight | 1,160 | 1,240 |
| Brookfield viscosity, cps | ¹ 38,000 | ² 52,005 |

¹ At 20° C.   ² At 19° C.

EXAMPLE VI

Example I was duplicated to prepare two solid prepolymers containing 6.2 and 8.3 percent by weight neohexene and having melt flows at 44 p.s.i. and 190° C. of 1650 and 4180 decigrams per minute respectively.

EXAMPLE VII

Into a 200 ml. capacity titanium lined pressure vessel were placed 22.48 grams of the —CN terminated ethylene-neohexene prepolymer of Example V-B, 100 ml. n-butanol and 15 grams lithium hydroxide monohydrate. The sealed vessel was rocked under autogenic pressure at 250° C. for a total of 35 hours reaction time. After cooling to room temperature, dissolving in hexene and transferring to a separatory funnel, the reaction mixture was worked up by adding 75 ml. 6 N HCl to neutralize the excess base and the carboxylate groups, and then extracted several times with 0.1 N HCl (9× 250 ml.) and then with saturated aqueous sodium chloride (3× 100 ml.). The resulting hexane solution was evaporated on a rotary evaporator under vacuum to remove the hexane and the butanol not extracted by the aqueous washes. The resulting amber syrup was re-dissolved in hexane, dried, filtered, and reevaporated to give 18.29 g. of product.

Examination of the product by infrared spectroscopy showed that an absolute amount less that 0.0139% by weight of the original nitrile terminal groups remained in the hydrolyzed product. Very intense absorption due to carboxyl groups was present near 1,700 cm.$^{-1}$.

EXAMPLE VIII 20.09 g. of the —CN terminated ethylene-neohexene prepolymer of Example V-A, 4.01 g. sodium hydroxide pellets, 1.8 ml. H₂O and 100 ml. n-butanol were placed in a 200 ml. titanium lined pressure vessel and rocked under autogenic pressure at 250° C. for 20 hours 40 minutes, then worked up as in Example VII. The product was 16.36 g. of viscous amber syrup. The infrared spectrum showed that less than 3% of the original nitrile groups remained. Very intense carboxyl absorption was present.

EXAMPLE IX

The procedure of Example III was followed. The following were initially charged to the autoclave.

|  | G. |
|---|---|
| Neohexene | 494 |
| Tetrahydrofuran (THF) solvent | 113 |
| Succinic acid peroxide (SAP) initiator | 497 |
| Ethylene under 500 p.s.i.g. | 105 |

Polymerization was conducted at 95° C. 51 grams succinic acid peroxide in 553 grams of tetrahydrofuran, was fed as follows.

|  | Ml. |
|---|---|
| 1st hour | 214 |
| 2nd hour | 171 |
| 3rd hour | 102 |
| 4th hour | 73 |
| 5th hour | 25 |
|  | 587 |

Ethylene pressure was 500 p.s.i.g. before starting SAP feed and rose to 15,000 p.s.i.g. 4.1 hours later. Reaction was continued for an additional 40 min., cooled to room temperature, and 1021 grams of a dark, clear solution was recovered. The solution was filtered and given a cold water extraction in separatory funnel to remove any peroxides. THF and neohexene were stripped off at 225 mm. to 35° C. The concentrate was further washed with hot distilled water to remove succinic acid and water soluble products. The organic layer was dissolved in benzene, treated to remove moisture and filtered. The filtrate was concentrated in an open beaker on a hot plate, and finally dried in a vacuum oven at 50° C. and 29″ water. 72 grams of dark yellow oily polymer was recovered containing 66 percent neohexene. The prepolymer had the following physical properties:

| Specific viscosity | 0.0195 |
|---|---|
| Neutralization equivalent | 896 |
| Saponification eq. | 623 |
| Acid No. | 62.6 |
| Saponification No. | 90 |
| Ester value | 27.4 |
| Percent esters | 26.5 |

The carboxy terminated prepolymer prepared in this example is cured to a flexible product with a stoichiometric amount of propane triol and is reacted with a stoichiometric amount of ethylene glycol to produce a linear polyester.

EXAMPLES X–XIV

To a 1.5 liter capacity, stainless steel lined, Magnedrive autoclave was charged:

3 grams azobisisobutyronitrile (AIBN) in 100 grams benzene and 625 grams of neohexene. The autoclave was sealed and purged with ethylene by pressuring to 50 p.s.i.g. and venting to atmospheric pressure. This purge was repeated two more times. The autoclave was then pressured to 1,000 p.s.i.g. with ethylene and the agitator was started at 750 r.p.m. The autoclave's contents were then heated to 90° C. by the passage of tempered water through the jacket. After reaching 90° C. internal temperature, the ethylene pressure was adjusted to 7,500 p.s.i.g.

A nine weight percent solution of azobisisobutyronitrile in benzene was pumped into the autoclave per the following schedule:

|  | Ml. |
|---|---|
| 1st 30 min. | 110 |
| 2nd 30 min. | 92 |
| 3rd 30 min. | 63 |
| 4th 30 min. | 49 |
| 5th 30 min. | 31 |
| 6th 30 min. | 21 |
| 7th 30 min. | 9 |
| 8th 30 min. | 9 |

At the end of this pumping period the system pressure was 8,200 p.s.i.g. The reaction was continued for an additional thirty minutes with the pressure dropping to 8,100 p.s.i.g. The autoclave was cooled to 30° C., the gas vented from the top, and 1032 grams of liquids recovered. This crude product was stripped in a rotating flask under house vacuum (~250 mm.) at ambient temperature to remove neohexene and volatiles. Benzene was added to the viscous polymeric liquid and the solution was transferred to a separatory funnel where the decomposition products of azobisisobutyronitrile was extracted by repeated washings (at least five) with 150 ml. methanol. The benzene layer was transferred back to a smaller, 250 ml. rotating flask and stripped to a final kettle temperature of 120° C. under about 5 mm. Hg vacuum with $N_2$ passing through the ebullating tube. About 116 grams of light colored liquid was obtained. Physical properties are listed in the table. In a similar manner, liquid prepolymers were produced in four more runs and the data on charges, conditions and properties is listed in the table.

TABLE

| Example No. | X | XI | XII | XIII | XIV |
|---|---|---|---|---|---|
| Benzene, gms. (initial) | 100 | 100 | 100 | 100 | 100 |
| Benzene, gms. (fed) | 310 | 310 | 310 | 310 | 310 |
| Neohexene, gms | 625.5 | 625.5 | 625.5 | 625.5 | 625.5 |
| Neohexene, wt. percent (Feed) | 75 | 75 | 75 | 75 | 75 |
| AIBN, gms. (initial) | 3 | 3 | 3 | 3 | 3 |
| AIBN, gms. (fed) | 31 | 31 | 31 | 31 | 31 |
| Temp., °C | 90 | 90 | 90 | 90 | 90 |
| Pressure, psi. (initial) | 7,500 | 7,500 | 7,500 | 7,500 | 7,500 |
| Pressure, psi. (final) | 8,100 | 8,250 | 7,500 | 8,200 | 7,500 |
| Time, hrs | 4.5 | 4.5 | 4.75 | 3.4 | 4.27 |
| Resin, gms | 116 | 105 | 97 | 110 | 97 |
| Percent Neohexene [1] | 55.7 | 59.4 | 60.3 | 57.2 | 60.9 |
| Specific viscosity | 0.031 | 0.030 | 0.031 | 0.033 | 0.024 |
| Wt. percent $N_2$ | 2.74 | 2.57 | 2.52 | 2.61 | 2.47 |
| Molecular weight [2] | 1,358 | 1,197 | 1,110 | 1,086 | 1,083 |
| Average No. of N Groups Per Polymer Molecule | ~2 | ~2 | ~2 | ~2 | ~2 |
| Viscosity, cps. at 25° C | 18,500 | 31,300 | 25,500 | 24,400 | 25,200 |

[1] Determined by Nuclear Magnetic Resonance Spectroscopy.
[2] Number Average Determined by vapor phase osmometry using a Mechrolab Osmometer.

EXAMPLE XV 100 parts of the —CN terminated ethylene-neohexene copolymer prepared in Example X was heated at 210–220° C. under autogenic pressure with 62 parts 48% aqueous HBr in a sealed glass reaction vessel. This temperature was maintained and the vessel agitated for 16 hrs. At the end of this reaction time, the vessel was cooled, then opened, and the product taken up in hexane and washed with water, then dried over anhydrous magnesium sulfate and the solvent removed. 94 parts of a viscous amber syrup resulted. The infrared spectrum showed only a minute absorption due to nitrile groups indicating less than 2% of the original amount were present. Intense carboxyl absorption was present.

EXAMPLE XVI 5.96 grams 4,4-azobis-4-cyanopentanoic acid in 130 gm. THF (tetrahydrofuran) and 494 grams neohexene were charged to open autoclave. The autoclave was sealed, purged 3 times by pressuring to 50 p.s.i.g. with ethylene and venting to atmospheric pressure. It was then pressured to 924 p.s.i.g. with ethylene. The started agitator was at 750 r.p.m. (pressure dropped to 500 p.s.i.g.) and heated to 120° C. The pressure rose to 700 p.s.i.g. Started to feed solution of 61.4 gm. of 4,4-azobis-4-cyanopentanoic acid in 553 grams THF, as follows:

|  | Ml. |
|---|---|
| 1st 30 min. | 168 |
| 2nd 30 min. | 154 |
| 3rd 30 min. | 135 |
| 4th 30 min. | 123 |
| 5th 30 min. | 90 |

Pressure rose to 16,000 p.s.i.g. at the end of feed. Allowed to run an additional 30 minutes. Cooled and recovered 987 grams oil. A liquid prepolymer was recovered as in Example IX.

EXAMPLE XVII

The same initial charge and pressuring procedure was followed as in Example XVI. 30.7 grams 4,4-azobis-4-cyanopentanoic acid in 276 grams THF, and a chain stopper solution, 26.1 grams of dithiodibutyric acid in 276 grams TNF, were fed in separate streams to the reactor as follows:

|  | Ml. |
|---|---|
| 1st 30 min. | 83 |
| 2nd 30 min. | 77 |
| 3rd 30 min. | 68 |
| 4th 30 min. | 61 |
| 5th 30 min. | 45 |

The reaction was allowed to continue an additional 30 minutes. The autoclave was cooled and recovered. A liquid prepolymer was recovered as in Example IX.

EXAMPLE XVIII

Example X is duplicated using instead diethyl-2,2'-azobisisobutyrate as the initiator to prepare an ethoxycarbonyl terminated liquid prepolymer. The ethoxycarbonyl groups are converted to hydroxyl groups by reduction with lithium aluminum hydride. The —OH terminated prepolymer is cured with a stoichiometric amount of tris-(N methyl ethylene imine) phosphorus oxide to an estomeric product and is reacted with a stoichiometric amount of 2,4-tolylene diisocyanate to produce a linear polymethanol, and is reacted with a stoichiometric amount of succinic acid to produce a linear polyester.

EXAMPLE XIX 40.88 g. ethylene-neohexene copolymer from Example X was heated in the absence of added solvent at 125° C. with 5.41 g. sodium hydroxide pellets while passing steam through the well agitated reaction mixture. After being allowed to react under these conditions for 16 hrs., the product was dissolved in hexane, acidified and washed with water, dried over anhydrous $MgSO_4$ and evaporated to give an amber syrup. The infrared spectrum of this material showed about 10% of the original nitrile absorption and very intense carboxyl absorption. Treatment was continued under the same hydrolytic conditions as above (with the exception that the temperature was increased to 250° C. instead of 125° C.) for 3½ hours gave a product, which, after workup as before, contained less than 5% of the original amount of nitrile functionality.

Specific viscosity where used in the examples was determined by ASTM D1601–58T in methyl cyclohexane at 80° C.

Because the prepolymers of this invention contain reactive functional groups they are emulsifiable and are readily emulsified in the conventional manner by mixing the prepolymer with a $C_1$ to $C_{32}$ fatty acid, an amine, and water with agitation. Stable emulsions which vary less than 1% in solids content after standing for one week are obtained. The prepolymers of this invention are useful in the preparation of emulsions which can be used as decorative and protective coatings for a wide variety of surfaces ranging from floor and wall tiles to shoe leathers and car polish. The prepolymers can also be used to promote adhesion between various substrates, as an additive in conventional printing ink formulations to improve ink adhesion, and as finishing agents for fibers and textiles. It is also possible to prepare low molecular weight polyethylene wax having reactive functional groups at the ends of each polymer molecule by the method disclosed herein. Such a polyethylene is emulsifiable like the prepolymer and is useful as described above for the prepolymer.

The hardness of the polyethylene wax can be varied by varying the concentration of alpha-olefin in the copolymer. Maximum hardness is attained when the alpha-olefin is omitted and ethylene is homopolymerized in the presence of chain transfer agents as described herein.

EXAMPLES XX–XXV

Prepolymers were prepared in a stirred autoclave by polymerizing ethylene with neohexene and/or propylene or isobutylene using azobisisobutyronitrile (AIBN) as the initiators and bromotrichloromethane ($BrCCl_3$) as the chain transfer agents (CTA). Results are summarized in the table.

version was 13.1%. The polymer contained 51.58% carbon and 6.56% hydrogen. The remainder of polymer weight was fluorine (from trifluoropropene) and bromine from the transfer agent (BBIB). After conversion of Br and ester terminal groups to —COOH groups, the polymer was reacted with a stoichiometric amount of the triglycidyl ether of para-aminophenol using stannous octate

| Example No. | XX | XXI | XXII | XXIII | XXIV | XXV |
|---|---|---|---|---|---|---|
| Charge: | | | | | | |
| L./l. Benzene/t-BuOH, gms. | 183.6 | 139.9 | 149.7 | 139.9 | 152 | 139.9 |
| Benzene, gms. | | | | | | |
| Ethylene, gms. | 330 | 384 | 323 | 434 | 307 | 326 |
| Propylene, gms. | 420 | 528 | 215 | | | |
| Isobutylene, gms. | | | | 580 | 272 | 583 |
| Neohexene, gms. | | | 432.7 | | 408 | |
| $BrCCl_3$ gms. | 43.82 | 33.5 | 28.45 | 28.78 | 35.89 | 28.78 |
| AIBN, gms. | 2.01 | 1.27 | 1.36 | 2.47 | 1.38 | 1.27 |
| Temp. ° C. | 90 | 90 | 90 | 90 | 90 | 90 |
| Pressure, p.s.i.g. | 9,250 | 15,000 | 20,000 | 20,000 | 20,000 | 18,200 |
| Yield, gms. | 35 | 49 | 45 | 53 | 37 | 43 |
| Percent Conversion | 4.85 | 5.48 | 4.63 | 5.22 | 3.75 | 4.73 |
| Physical Properties: | | | | | | |
| Molecular Weight | | 421 | | 527 | | |
| Viscosity, cps. | >40 | 160 | 160 | 440 | 140 | >40 |
| Weight percent Br | 22.07 | 17.94 | 16.14 | 12.74 | 15.95 | 17.33 |
| Weight percent Cl | 35.76 | 22.58 | 22.21 | 17.19 | 22.27 | 22.59 |

The products from Examples XX through XXV were found to be terminated by bromine atoms and by $CCl_3$ groups. Bromine is removed by dehydrobromination and the resulting double bonds are oxidized to carboxylic acid groups. The $CCl_3$ groups are converted to —COOH groups by strong alkaline saponification or treatment with fuming $HNO_3$. The polymers containing terminal —COOH groups are cured with MAPO to give soft rubbery gels.

EXAMPLES XXVI–XXX

Prepolymers were prepared in a stirred autoclave by polymerizing ethylene and propylene using dimethyl azobisisobutyrate (DMAB) as the initiator and t-butyl-bromoisobutyrate (BBIB) or alpha-bromoisobutyric acid (BIBA) as the chain transfer agents. Results are summarized in the table.

as an accelerator. An oxidation resistant vulcanized rubber was obtained.

EXAMPLE XXXII

Example XXXI was repeated but no BBIB chain transfer agent added. The catalyst was di-tertiary butyl peroxide (0.025 gram). The temperature was 140° C. and the pressure about 20,000 p.s.i.g. Reaction time was 3.58 hours. Yield of polymer was 42 grams, 47% conversion. Specific viscosity was 0.0569 and the molecular weight was 7627. This was an amorphous, sticky polymer.

EXAMPLE XXXIII

Example XXXII was repeated using 34.2% ethylene and 65.8% tetrafluoropropene ($CF_3CF{=}CH_2$). The reaction was carried out at 140° C. and 15,000 p.s.i.g. using benzene and di-tertiary butyl peroxide as the catalyst.

| Example No. | XXVI | XXVII | XXVIII | XXIX | XXX |
|---|---|---|---|---|---|
| Charge (Weight Percent of Total Charge): | | | | | |
| Benzene | 10.53 | 10.53 | 10.53 | 11.49 | 11.49 |
| Ethylene | 47.87 | 47.87 | 47.87 | 44.83 | 44.83 |
| Propylene | 40.80 | 40.80 | 40.80 | 42.56 | 42.56 |
| BIBA | 0.66 | 0.66 | 0.66 | | |
| BBIB | | | | 0.96 | 0.96 |
| DMAB | 0.14 | 0.14 | 0.14 | 0.15 | 0.15 |
| Temp. ° C. | 123 | 110 | 100 | 110 | 110 |
| Pressure, p.s.i.g. | 20,000 | 20,000 | 20,000 | 20,000 | 20,000 |
| Yield, gms. | 107 | 136 | 73 | 175 | 172 |
| Percent Conversion | 2.26 | 2.79 | 2.63 | 2.80 | 2.97 |
| Physical Properties: | | | | | |
| Molecular Weight | 744 | 775 | 684 | 1,189 | |
| Viscosity, cps. | 2,805 | 2,912 | 3,156 | 6,830 | 5,620 |
| Weight Percent Br | 7.5 | 6.53 | 7.73 | 3.84 | |
| Weight Percent C | 76.54 | 76.94 | 75.56 | 80.47 | |
| Weight Percent H | 12.94 | 13.11 | 12.48 | 12.83 | |
| Weight Percent O | 3.02 | 3.42 | 4.23 | 2.86 | |

After dehydrobromination and oxidation, the resulting products contained no halogen or ester groups. The products are directed to soft rubbery gels with MAPO.

EXAMPLE XXXI

To a stirred autoclave was charged 75 grams benzene, 0.14 gram DMAB, and 0.87 gram BBIB. The autoclave was sealed, purged with $N_2$, then was charged with 53 grams of trifluoropropene (66 weight percent), and 146 grams of benzene/t-BuOH (1/1 mixture). The autoclave was pressurized to 500 p.s.i. with ethylene then heated to 90° C. with stirring and addition of more ethylene to 15,000. The reaction was carried out at 90° C. and 15,000 p.s.i for four hours. The autoclave was cooled to 40° C. The yield was 10.5 grams of rubbery polymers. Con- The yield was 262 grams of an amorphous, rubbery polymer.

A preferred preparation is as follows:

A liquid, amorphous prepolymer comprising an interpolymer of ethylene and propylene in approximately equal proportions by weight having a carboxylic acid group attached at each end of each chain of a molecular weight of about 1000 and a viscosity of about 5000 cps. is prepared by reacting approximately equal weights of ethylene and propylene, using dimethyl azobisisobutyrate as initiator and alpha bromo-isobutyric acid as chain transfer agent. The temperature during reaction is 90–100° C. and the pressure approximately 20,000 p.s.i. The foregoing reaction is carried out under continuous conditions, i.e., the ethylene, propylene, dimethyl azobisisobutyrate, alpha bromoisobutyrate ester or acid and a minor amount of benzene are added simultaneously to a hydraulically filled reaction vessel and an equal volume of product is withdrawn continuously.

The resulting polymer is found to contain about one bromine atom per molecule and one ester group per molecule. The ester group is hydrolyzed to a carboxylic acid group by acid or basic hydrolysis. The bromine atom is removed by dehydrohalogenation followed by oxidation of the resulting double bond with ozone and subsequent treatment with an oxidizing acid.

The polymer described above prior to hydrolysis is reduced with lithium aluminum hydride followed by permangate oxidation to give a polymer having an hydroxyl group at each end of each molecule.

The prepolymers described above are unique in that they are unusually low in viscosity when compared to other prepolymers of the same molecular weight. They are also unique in that they have outstanding low temperature properties when compared to other saturated polymers such as those resulting from the hydrogenation of low molecular weight polybutadiene.

The products from the preferred preparation are cured with either aziridinyl compounds such as MAPO or epoxy compounds such as the triglycidyl ether of para-aminophenol. Because of the unusually low viscosity of these prepolymers they are fluid at the low temperatures of cure required in many applications. Because of their freedom from unsaturation, these products have exceptional resistance to ozone attack and are useful for sealant and gasketing applications where oxidizing environments are encountered.

What is claimed is:

1. Saturated hydrocarbon, amorphous, liquid prepolymer comprising a free-radical initiated, substantially random interpolymer of ethylene and, based on the weight of said interpolymer, from about 30 to 70 percent by weight of an alpha-olefin having the formula $$H_2C=\overset{R}{\underset{R}{C}}-\overset{R}{C}-R$$

wherein each R individually represents hydrogen, an alkyl group of 1 to 6 carbon atoms inclusive, or fluorine, said interpolymer having an average of from about 1 to about 2 reactive functional groups attached to the terminal carbon atoms of each polymer molecule selected from the group of hydroxyl, carboxy, amino, cyano, formyl, aziridinyl and alkoxycarbonyl, said interpolymer having a viscosity of from about 100 to about 55,000 cps. at 25° C.

2. Prepolymer of claim 1 wherein said alpha-olefin is propene-1, 2-methyl propene-1, or 3,3-dimethylbutene-1.

3. Curable composition comprising an amorphous, liquid, free-radical initiated, substantially random saturated interpolymer of ethylene and, based on the weight of said interpolymer, from about 30 to about 70 percent by weight of an alpha-olefin having the formula $$H_2C=\overset{R}{\underset{R}{C}}-\overset{R}{C}-R$$

wherein each R individually represents hydrogen, an alkyl group of 1 to 6 carbon atoms inclusive or fluorine, said interpolymer having an average of from about 1 to about 2 reactive functional groups attached to the terminal carbon atoms of each polymer molecule selected from the group of hydroxyl, carboxy, amino, cyano, formyl, aziridinyl and alkoxycarbonyl and a polyfunctional cross-linking agent having reactive groups capable of reacting with the reactive functional groups of said interpolymer.

4. Composition of claim 3 wherein said alpha-olefin is propene-1, 2 - methyl propene-1 or 3,3-dimethyl butene-1.

5. The cured composition of claim 3.

6. The cured composition of claim 4.

7. High molecular weight linear reaction product of a saturated hydrocarbon amorphous, liquid prepolymer comprising a substantially random interpolymer of ethylene and, based on the weight of said interpolymer from about 30 to about 70 percent by weight of an alpha-olefin having the formula $$H_2C=\overset{R}{\underset{R}{C}}-\overset{R}{C}-R$$

wherein each R individually represents hydrogen, an alkyl group of 1 to 6 carbon atoms inclusive or fluorine, said interpolymer having an average of from about 1 to about 2 reactive functional groups attached to the terminal carbon atoms of each polymer molecule selected from the group of hydroxyl, carboxy, amino, cyano, formyl, aziridinyl and alkoxycarbonyl and a difunctional compound having reactive groups capable of reacting with the reactive functional groups of said interpolymer.

8. Product of claim 7 wherein said alpha-olefin is propene-1, 2-methyl propene-1, or is 3,3-dimethyl butene-1.

References Cited

UNITED STATES PATENTS

| | | | |
|---|---|---|---|
| 2,551,638 | 5/1951 | Seger | 260—683.15 |
| 2,728,752 | 12/1955 | Brown | 260—88.1 |
| 2,839,515 | 6/1958 | Davison | 260—88.1 |
| 3,129,212 | 4/1964 | Mortimer | 260—94.9 |
| 3,197,449 | 7/1965 | Reding | 260—88.2 |
| 3,305,523 | 2/1967 | Burnside | 260—46.5 |
| 3,316,202 | 4/1967 | Abere | 260—29.7 |
| 3,328,362 | 6/1967 | Roberts | 260—79.3 |
| 3,346,546 | 10/1967 | Beach | 260—94.7 |
| 3,377,330 | 4/1968 | Mortimer | 260—94.9 |

JOSEPH L. SCHOFER, Primary Examiner

J. C. HAIGHT, Assistant Examiner

U.S. Cl. X.R.

117—132, 138.5, 138,8, 142; 260—28.5, 29.6, 47, 73, 75, 78, 78.5, 80.78, 85.5, 86.1, 87.5, 88.1, 465.1, 465.8, 478, 485, 635, 638